(12) United States Patent
Mouri

(10) Patent No.: US 8,976,316 B2
(45) Date of Patent: Mar. 10, 2015

(54) LIGHTING DEVICE, DISPLAY DEVICE AND TELEVISION RECEIVER

(75) Inventor: Hirokazu Mouri, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 483 days.

(21) Appl. No.: 13/376,718

(22) PCT Filed: Jun. 4, 2010

(86) PCT No.: PCT/JP2010/059527
§ 371 (c)(1),
(2), (4) Date: Dec. 7, 2011

(87) PCT Pub. No.: WO2010/147007
PCT Pub. Date: Dec. 23, 2010

(65) Prior Publication Data
US 2012/0086886 A1  Apr. 12, 2012

(30) Foreign Application Priority Data

Jun. 15, 2009 (JP) ................................. 2009-142308

(51) Int. Cl.
*G02F 1/1335* (2006.01)

(52) U.S. Cl.
CPC .... *G02F 1/133603* (2013.01); *G02F 1/133609* (2013.01); *G02F 2001/133613* (2013.01)
USPC .............................................. 349/61; 349/62

(58) Field of Classification Search
USPC ...................................... 349/61, 62
See application file for complete search history.

(56) References Cited

U.S. PATENT DOCUMENTS

| | | | |
|---|---|---|---|
| 6,508,564 B1 | 1/2003 | Kuwabara et al. | |
| 2005/0135094 A1 | 6/2005 | Lee et al. | |
| 2005/0253528 A1* | 11/2005 | Schoeller et al. | 313/637 |
| 2006/0028122 A1* | 2/2006 | Wang et al. | 313/503 |
| 2006/0198968 A1 | 9/2006 | Goto et al. | |
| 2006/0262282 A1* | 11/2006 | Magarill | 353/94 |
| 2007/0115228 A1 | 5/2007 | Roberts et al. | |
| 2007/0115248 A1 | 5/2007 | Roberts et al. | |
| 2007/0115662 A1 | 5/2007 | Roberts et al. | |
| 2007/0115670 A1 | 5/2007 | Roberts et al. | |
| 2007/0115671 A1 | 5/2007 | Roberts et al. | |

(Continued)

FOREIGN PATENT DOCUMENTS

| CN | 101206345 A | 6/2008 |
|---|---|---|
| CN | 101375202 A | 2/2009 |

(Continued)

OTHER PUBLICATIONS

Official Communication issued in International Patent Application No. PCT/JP2010/059527, mailed on Aug. 31, 2010.

(Continued)

*Primary Examiner* — Lucy Chien
(74) *Attorney, Agent, or Firm* — Keating & Bennett, LLP

(57) ABSTRACT

A lighting device configured to produce light in a substantially uniform overall color includes a plurality of light source boards and a plurality of point light sources. The point light sources are mounted on the light source boards. An average color of the point light sources is in an equivalent color range. The equivalent color range is defined by a square with two sides that are opposed sides each having an X-axis coordinate length of 0.015 and two sides that are opposed sides each having a Y-axis coordinate length of 0.015 in the CIE 1931 color space chromaticity diagram.

26 Claims, 17 Drawing Sheets

(56) References Cited

U.S. PATENT DOCUMENTS

| | | |
|---|---|---|
| 2007/0115682 A1 | 5/2007 | Roberts et al. |
| 2007/0216704 A1 | 9/2007 | Roberts et al. |
| 2008/0007509 A1 | 1/2008 | Lankhorst et al. |
| 2008/0111471 A1 | 5/2008 | Blumel et al. |
| 2008/0285268 A1 | 11/2008 | Oku et al. |
| 2009/0059579 A1 | 3/2009 | Shin et al. |
| 2009/0168399 A1* | 7/2009 | Kim et al. .................. 362/84 |
| 2009/0180273 A1 | 7/2009 | Kim et al. |
| 2009/0213575 A1 | 8/2009 | Blümel et al. |
| 2009/0219714 A1 | 9/2009 | Negley et al. |
| 2009/0264683 A1 | 10/2009 | Goto et al. |
| 2009/0310335 A1 | 12/2009 | Park |
| 2010/0039806 A1 | 2/2010 | Roberts et al. |
| 2010/0135028 A1 | 6/2010 | Kokubo |
| 2011/0006325 A1 | 1/2011 | Ishii et al. |
| 2011/0127917 A1 | 6/2011 | Roberts et al. |
| 2011/0157492 A1 | 6/2011 | Shin et al. |

FOREIGN PATENT DOCUMENTS

| | | |
|---|---|---|
| CN | 201242640 Y | 5/2009 |
| EP | 1 811 332 A1 | 7/2007 |
| JP | 2006-133708 A | 5/2006 |
| JP | 2009-43628 A | 2/2009 |
| JP | 2009-54563 A | 3/2009 |
| JP | 2009-510764 A | 3/2009 |
| JP | 2009-516357 A | 4/2009 |
| JP | 2009-130360 A | 6/2009 |
| WO | 2008/127064 A1 | 10/2008 |
| WO | 2009/072539 A1 | 6/2009 |

OTHER PUBLICATIONS

Kasai et al., "Lighting Device, Display Device and Television Receiver", U.S. Appl. No. 13/376,716, filed Dec. 7, 2011.

English translation of Official Communication issued in corresponding Russian Patent Application No. 2011150816, mailed on Apr. 2, 2013.

Bergh et al., "Light-Emitting Diodes," Moscow, Publishing House MIR, 1979, pp. 37-41.

* cited by examiner

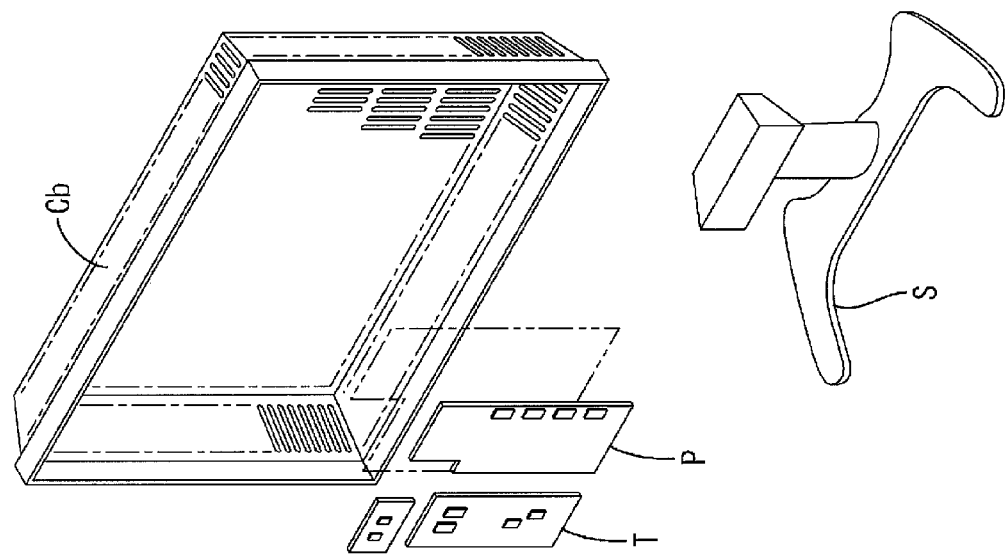
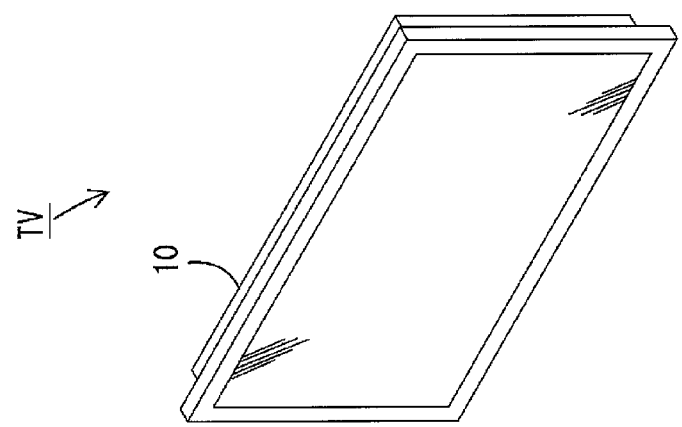
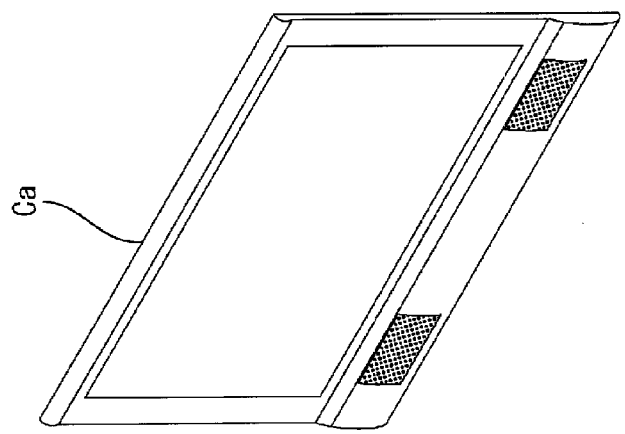
FIG.1

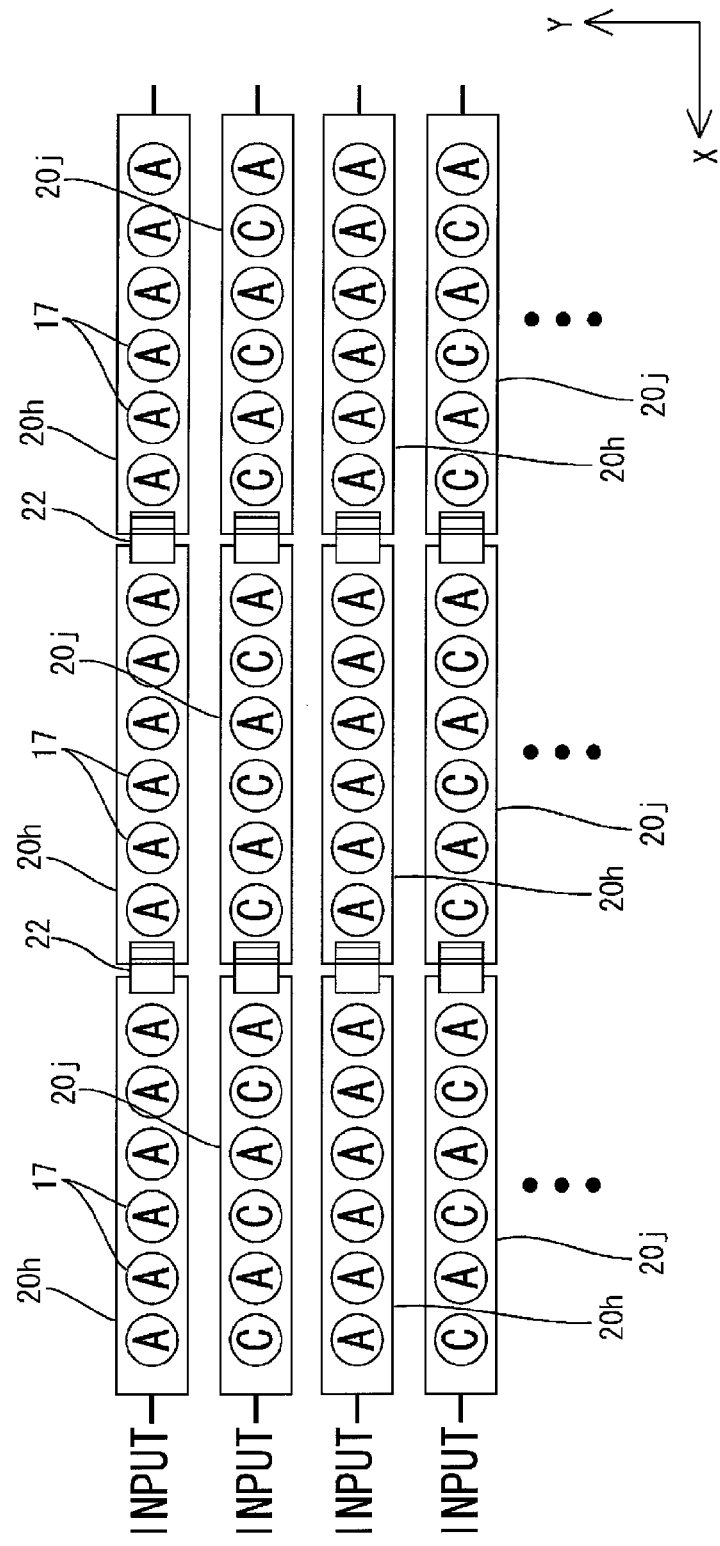

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television does not emit light, and thus a backlight device is required as a separate lighting device. A backlight device arranged behind the liquid crystal panel (i.e., on a side opposite from a display surface side) is known. It includes a plurality of light sources (e.g., LEDs).

Such a backlight device has a configuration in which white LEDs are installed. The white LEDs tend to produce color variances in white color. A device disclosed in Patent Document 1 is know as a device that can produce white light with a target color using white LEDs that tend to produce color variations. In this lighting device, an arrangement of the white LEDs is adjusted to obtain white light with a target color.

Patent Document 1: Japanese Unexamined Patent Publication No. 2009-54563

PROBLEM TO BE SOLVED BY THE INVENTION

In the device disclosed in Patent Document 1, white LEDs need to be arranged such that an amount of light emitted from the center of each of the adjacent LEDs apart from each other at a minimum distance is in a range between 80% and 120% of an average of a total amount of light emitted from the white LEDs. Therefore, the arrangement of the white LEDs is difficult to design and thus a large amount of time is required for arranging the white LEDs.

DISCLOSURE OF THE PRESENT INVENTION

The present invention was made in view of the foregoing circumstances. An object of the present invention is to provide a lighting device that can produce light with substantially uniform overall color. Other objects of the present invention are to provide a display device including such a lighting device, and a television receiver including such a display device.

MEANS FOR SOLVING THE PROBLEM

To solve the above problem, a lighting device of the present invention includes a plurality of light source boards and a plurality of point light sources mounted on the light source boards. The point light sources mounted on each light source board have colors, an average of which is in an equivalent color range. The color range is defined by a square with two sides that are opposed sides each having an X-axis coordinate length of 0.015 and two sides that are opposed side each having a Y-axis coordinate length of 0.015 in a CIE 1931 color space chromaticity diagram.

In general, the point light sources tend to produce color variations. The color variations may cause color variations in the lighting device. According to the present invention, an average color range is defined for each light source board on which the point light sources are mounted. Therefore, the color variations are less likely to occur in the lighting device. Specifically, the average color is set in the equivalent color range. The equivalent color range is defined by the square with two sides that are opposed sides each having the X-axis coordinate length of 0.015 and two sides that are opposed sides each having the Y-axis coordinate length of 0.015 in the CIE 1931 color space chromaticity diagram. The equivalent color range, which is defined by the square with two sides that are opposed sides each having the X-axis coordinate length of 0.015 and two sides that are opposed sides each having the Y-axis coordinate length of 0.015 in the CIE 1931 color space chromaticity diagram, is a range in which the colors are equivalent and color variations are less likely to be recognized. With this configuration, the color variations among the light source boards are less likely to occur. Therefore, the colors in an entire area are evened. Especially during movie display, illumination with a substantially uniform color can be achieved.

BRIEF DESCRIPTION OF THE DRAWINGS

FIG. 1 is an exploded perspective view illustrating a general construction of a television receiver according to a first embodiment of the present invention;

FIG. 17 is a schematic view illustrating arrangements of the LEDs in different color ranges on the LED boards.

MODE FOR CARRYING OUT THE INVENTION

A first embodiment of the present invention will be explained with reference to FIGS. 1 to 10.

First, a television receiver TV including a liquid crystal display device 10 will be explained.

Figure 2:
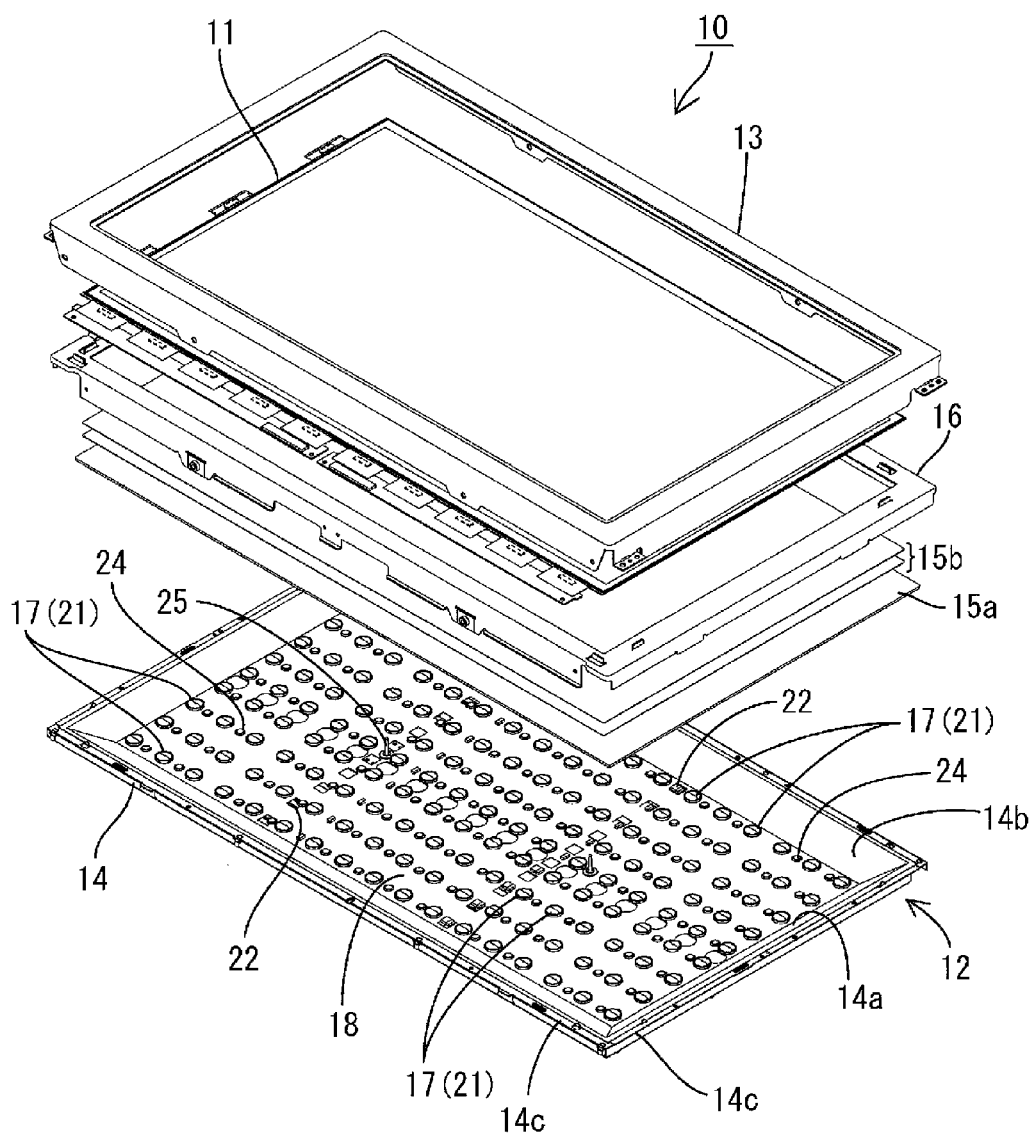
FIG. 2 is an exploded perspective view illustrating a general construction of a liquid crystal display device included in the television receiver.

As illustrated in FIG. 1, the television receiver TV of this embodiment includes the liquid crystal display device 10, front and rear cabinets Ca, Cb that house the liquid crystal display device 10 therebetween, a power source P, a tuner T and a stand S. An overall shape of the liquid crystal display device (a display device) 10 is a landscape rectangular. The liquid crystal display device 10 is held in a vertical position. As illustrated in FIG. 2, it includes a liquid crystal panel 11 as a display panel, and a backlight unit (a lighting device) 12, which is an external light source. They are integrally held by a bezel 13 having a frame-like shape.

Figure 3:
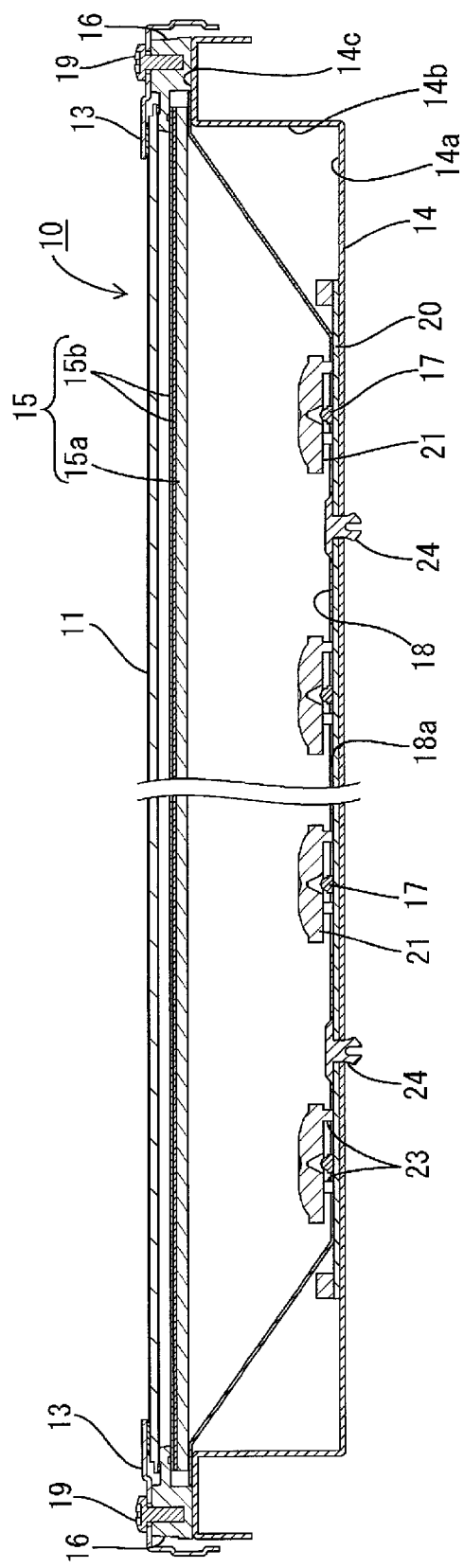
FIG. 3 is a cross-sectional view illustrating a cross-sectional configuration of the liquid crystal display device along the long-side direction.
Figure 4:
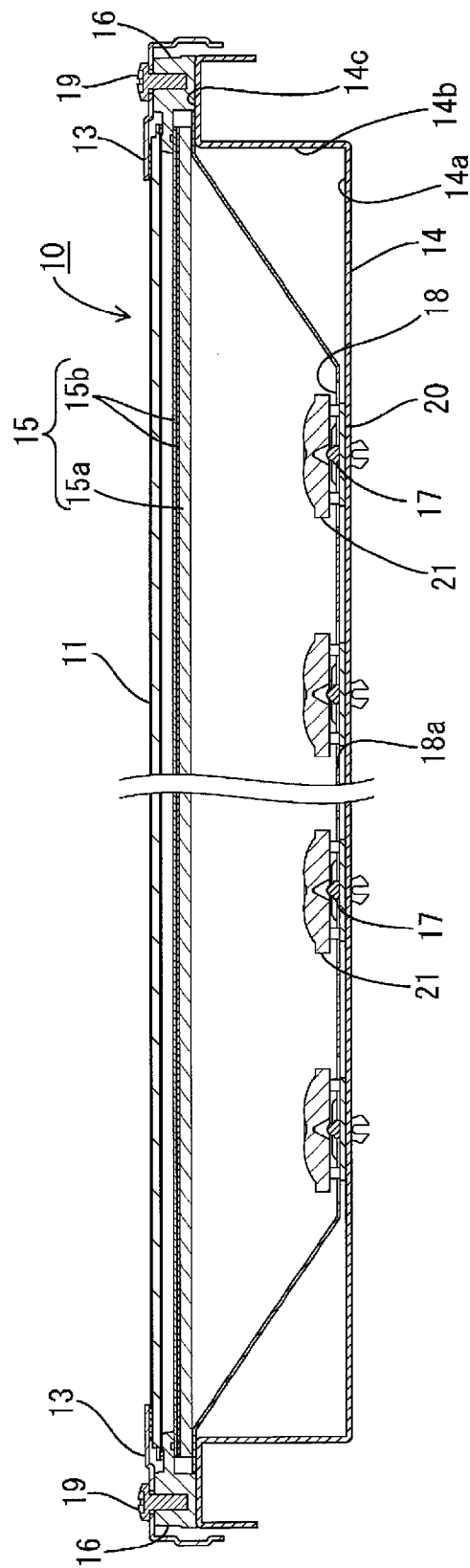
FIG. 4 is a cross-sectional view illustrating a cross-sectional configuration of the liquid crystal display device along the short-side direction.

Next, the liquid crystal panel 11 and the backlight unit 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates are attached to outer surfaces of the substrates.

As illustrated in FIG. 2, the backlight unit 12 includes a chassis 14, an optical sheet set 15 (a diffuser plate 15a and a plurality of optical sheets 15b arranged between the diffuser plate 15a and the liquid crystal panel 11), and frames 16. The chassis 14 has a box-like shape and an opening on the light emitting side (on the liquid crystal panel 11 side). The optical sheet set 15 is arranged so as to cover the opening of the chassis 14. The frames 16 are arranged along the long sides of the chassis 14. The frames 16 hold the long-side edges of the diffuser plate 15a to the chassis 14. The outer edges of the diffuser plate 15a are sandwiched between the chassis 14 and the frames 16. Light emitting diodes (point light sources, hereinafter referred to as LEDs) 17 are arranged in the chassis 14. A light emitting side of the backlight unit 12 is a side closer to the diffuser plate 15a than the cold cathode tubes 17.

The chassis 14 is made of metal. It includes a bottom plate 14a, side plates 14b, and receiving plates 14c. The bottom plate 14a has a rectangular shape similar to the liquid crystal panel 11. Each side plate 14b rises from an outer edge of the corresponding side of the bottom plate 14a. Each receiving plate 14c projects from the top edge of the corresponding side plate 14b. The chassis 14 has a shallow-box-like overall shape with an opening on the front side. As illustrated in FIGS. 3 and 4, the frames 16 are placed on the respective receiving plates 14c of the chassis 14. Outer edges of a reflection sheet 18 and optical sheet set 15 are sandwiched between the receiving plates 14c and the frames 16. The reflection sheet 18 will be explained later. Furthermore, mounting holes 16a are provided in the top surfaces of the frames 16. The bezel 13, the frames 16 and the chassis 14 are bound together with screws 19.

The optical sheet set 15 including the diffuser plate 15a and the optical sheets 15b is arranged on the opening side of the chassis 14. The diffuser plate 15a is constructed of a plate-like member made of synthetic resin with light-scattering particles dispersed therein. The diffuser plate 15a diffuses point light emitted from the LEDs 17 that are the point light sources. The outer edges of the diffuser plate 15a are placed on the receiving plates 14c of the chassis 14, as explained earlier. The outer edges of the diffuser plate 15a do not receive strong vertical forces that restrain the outer edges in the vertical direction.

Two optical sheets 15b layered and arranged on the diffuser plate 15a. Each optical sheet 15b has a sheet-like shape with a thickness larger than that of the diffuser plate 15a. Examples of the optical sheets 15b are a diffuser sheet, a lens sheet and a reflection-type polarizing sheet. Each optical sheet 15b can be selected from those sheets accordingly. The optical sheet 15b converts light emitted from the LEDs 17 and passed through the diffuser plate 15a into a planar light. The liquid crystal display panel 11 is arranged on the top surface of the optical sheet 15b.

A light reflection sheet 18 is arranged on inner surfaces of the bottom plate 14a and the side plates 14b of the chassis 14 so as to cover the substantially entire surfaces. The light reflection sheet 18 is a synthetic resin sheet having a surface in white color that provides high light reflectivity. The reflection sheet 18 has holes 18a at locations corresponding to the diffuser lenses 21, which will be explained later. An entire area of the bottom plate 14a of the chassis 14 is covered by the reflection sheet 18 except for areas in which the diffuser lenses 21 are arranged. The diffuser lenses 21 appear on the optical sheet set 15 side through the holes 18a. The edge portions of the light reflection sheet 18 are lifted at angles so as to cover the inner surfaces of the side plates 14b. The outer edges of the reflection sheet 18 are placed on the respective receiving plate 14c of the chassis 14. With this light reflection sheet 18, light emitted from the LEDs 17 is reflected toward the diffuser plate 15a.

Figure 5:
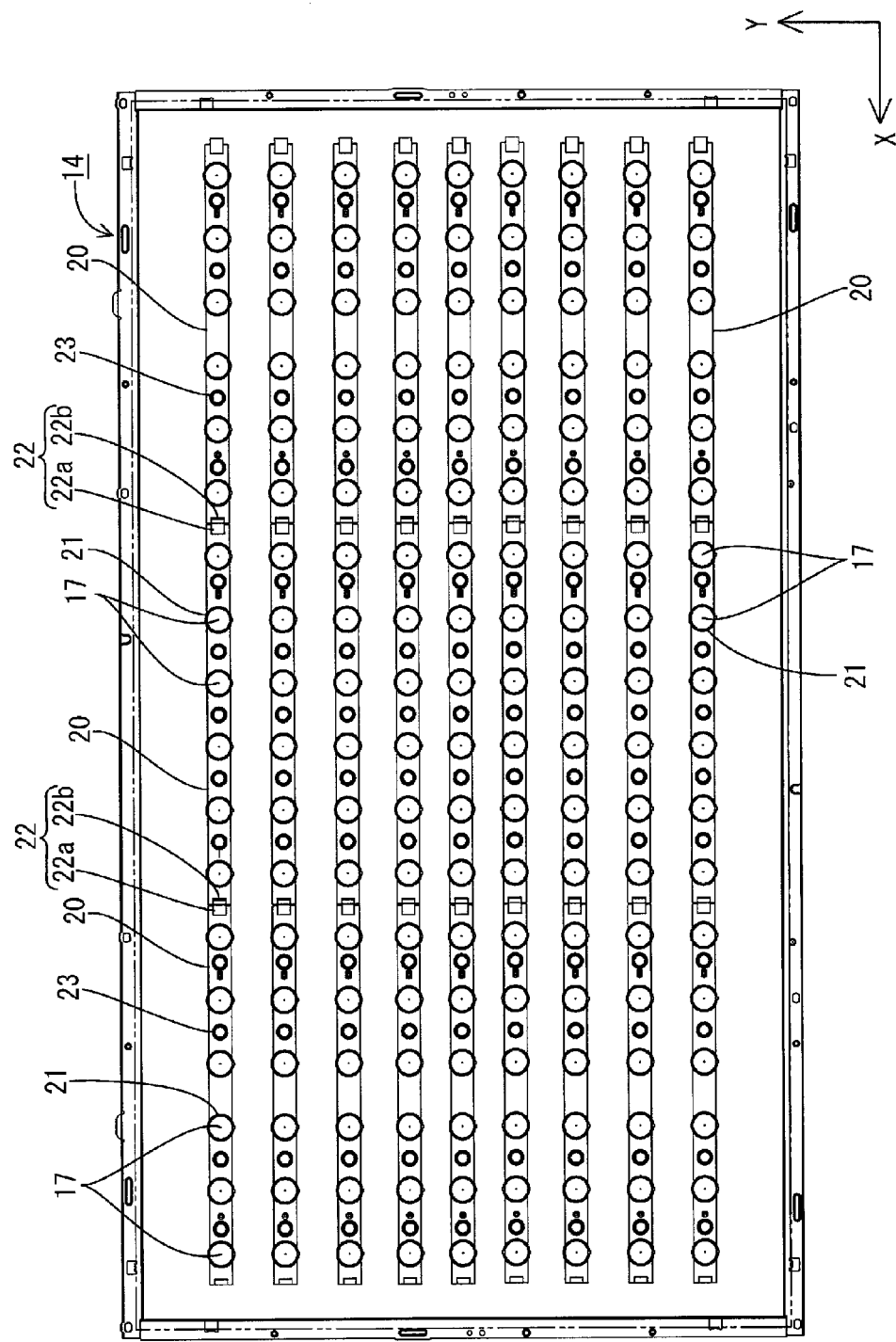
FIG. 5 is a plan view illustrating an arrangement of LED boards inside the chassis.

The LED boards (a light-source board) 20 on which the LEDs 17 and the diffuser lenses 21 are mounted are arranged on the inner surface of the bottom plate 14a of the chassis 14. Each LED board 20 is a synthetic resin board with a surface on which wiring patterns (not illustrated) are provided. The wiring patterns are metal films such as copper foils formed on the surface of the LED board 20. As illustrated in FIG. 5, each LED board 20 is an elongated plate-like member. The LED boards 20 are arranged with the longitudinal direction thereof aligned with the long-side direction (the X-axis direction) of the chassis 14. More specifically, three LED boards 20, 20, 20 are arranged with their longitudinal direction aligned with the long-side direction of the chassis 14. The LED boards 20, 20, 20 are electrically and physically connected by connectors 22. Nine lines, each of which includes three LED boards 20, 20, 20 connected in series in the short-side direction (the Y-axis direction) of the chassis 14. A control unit, which is not illustrated, is connected to the LED boards 20. The control unit is configured to supply power required for turning on the LEDs 17 and control driving of the LEDs 17.

Each connector 22 that connects the adjacent LED boards 20, 20 is in white color that provides high light reflectivity. In FIG. 5, each connector 22 includes a first connector 22a and a second connector 22b. The first connector 22a is attached to the left LED board 20 of the adjacent LED boards 20. The second connector 22b is attached to the right LED board 20 of the adjacent LED boards 20. The first connector 22a projects outward from the edge of the LED board 20 in the longitudinal direction. A connection between the adjacent LED boards 20, 20 is completed when the first connector 22a and the second connector 22b are engaged.

Six LEDs 17 are arranged in line on each LED board 20 along the longitudinal direction of the LED board 20. More specifically, six LEDs 17 are arranged at equal intervals and surface mounted on the LED board 20. Each LED 17 is prepared by applying a phosphor that has a light-emitting peak in a yellow range to a mono-color light emitting chip that emits blue light so that the LED 17 emits white light. The LEDs 17 are electrically connected in series via the wiring pattern on the LED board 20. The LED 17 may be prepared by applying a phosphor that has a light emitting peak in a green range and a phosphor that has a light emitting peak in a red range to a blue light emitting chip so that the LED 17 emits white light. The LED 17 may be prepared by a phosphor that has a light-emitting peak in a green range to a blue light emitting chip and combing it with a red light emitting chip so that the LED 17 emits white light. The LED 17 may be prepared by combining a blue light emitting chip, a green light emitting chip, and a red light emitting chip so that the LED 17 emits white light.

Figure 6:
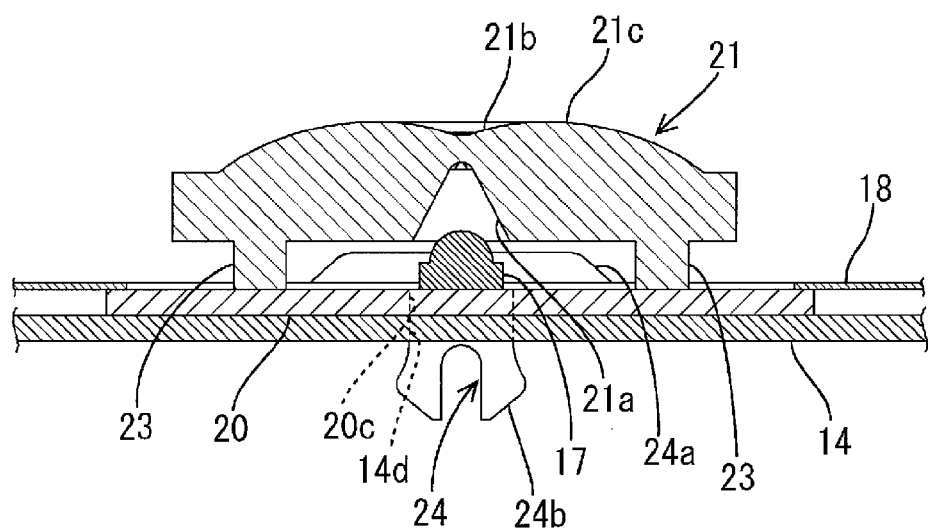
FIG. 6 is a partial magnified cross-sectional view illustrating a part mounted on the LED board.
Figure 7:
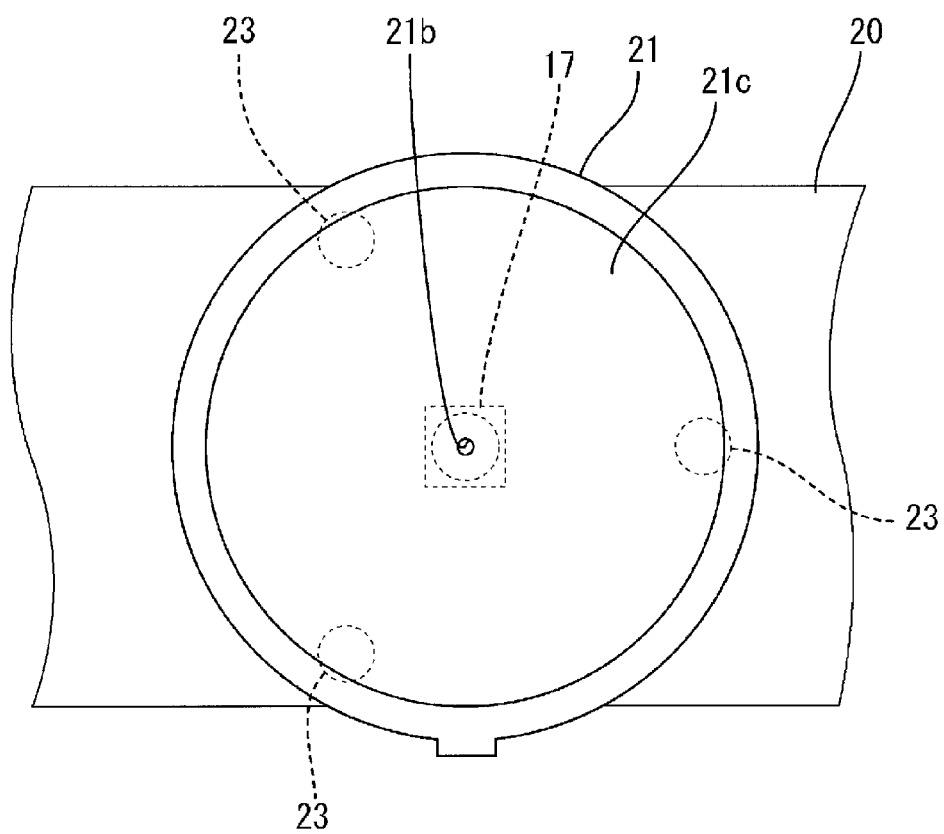
FIG. 7 is a partial magnified plan view illustrating the part mounted on the LED board.

As illustrated in FIG. 6, the diffuser lenses 21 are mounted on each LED board 20. Each diffuser lens 21 has a dome-like shape and covers the corresponding LED 17. Each diffuser lens 21 is a light diffusing member having high light diffuseness. The diffuser lens 21 is made of synthetic resin such as acrylic resin. Three legs 23 project from edge areas of the bottom surface of each diffuser lens 21. As illustrated in FIG. 7, the legs 23 are arranged at about equal intervals (about 120-degree intervals) along the edge of the diffuser lens 21, and fixed to the surface of the LED board 20 with adhesive or thermoset resin. An incident recess 21a is provided in an area of the bottom surface of the diffuser lens 21 (facing the LED 17 and the LED board 20) overlapping the LED 17 in plan view. The incident recess 21 is a cone-like hole that extends toward the top. The light from the LED 17 enters the incident recess 21a. The bottom surface of the diffuser lens 21 is treated by surface roughing such as texturing. A recess 21b is provided in a central area (overlapping the LED 17 in plan view) of the top surface of the diffuser lens 21 (facing the diffuser plate 15a). The recess 21b extends toward the bottom. The top surface includes two gently curved continuous light exit surfaces 21c. Light emitted from the LED 17 is refracted as it travels through an air layer, the incident recess 21a, and the light exit surface 21c. As a result, the light is diffused and emitted as planar light that travels in a wide-angle area from the recess 21b and the light exit surface 21c toward the diffuser plate 15a.

Each LED board 20 is fixed to the bottom plate 14a of the chassis 14 by rivets 24. Each rivet 24 includes a holddown portion 24a and a lock portion 24b. The holddown portion 24a has a disk-like shape. The lock portion 24b projects downward from the holddown portion 24a. The LED board 20 has insertion holes 20c through which the lock portion 24b are passed. The bottom plate 14a of the chassis 14 has mounting holes 14d that communicate with the respective insertion holes 20c. An end of the lock portion 24b of each rivet 24 is a wide portion that is elastically deformable. When the end of the lock portion 24b is passed through the insertion hole 20c and the mounting hole 14d, it is held against the rear surface of the bottom plate 14a of the chassis 14. With this configuration, each rivet 24 fixes the LED board 20 to the bottom plate 14a while pressing the LED board 20 with the holddown portion 24a.

As illustrated in FIG. 2, support pins 25 are arranged on the top surfaces of the rivets 24 located near the central part of the bottom plate 14a of the chassis 14. Each support pin 25 has a cone-like shape that narrows toward the tip. If the diffuser plate 15a bends downward, the tips of the support pins 25 are in point contact with the diffuser plate 15a. Namely, the support pins 25 support the diffuser plate 15a from below. Furthermore, the rivets 24 can be easily handled by holding the support pins 25.

Figure 8:
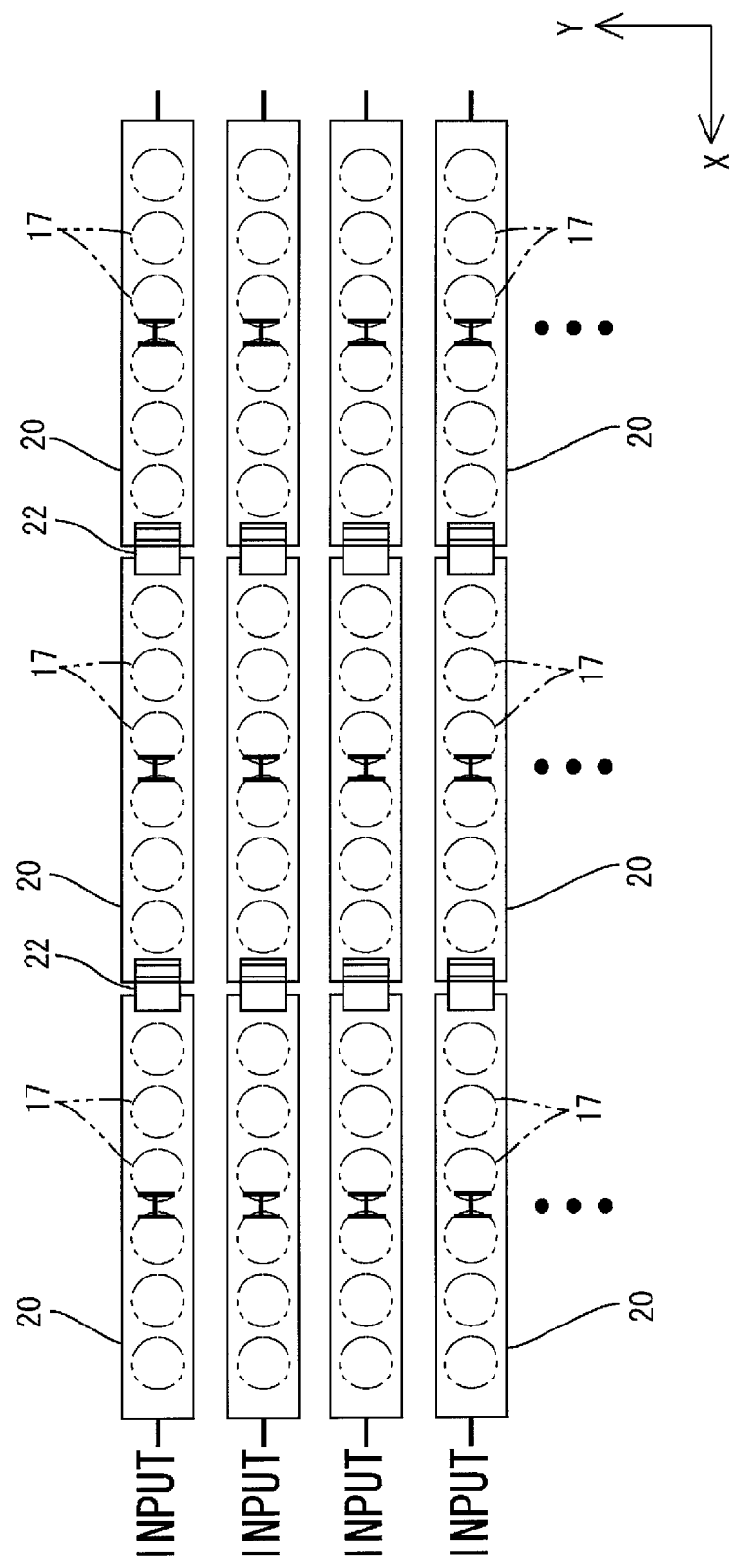
FIG. 8 is a schematic view for explaining an average color of LEDs on each LED board.
Figure 9:
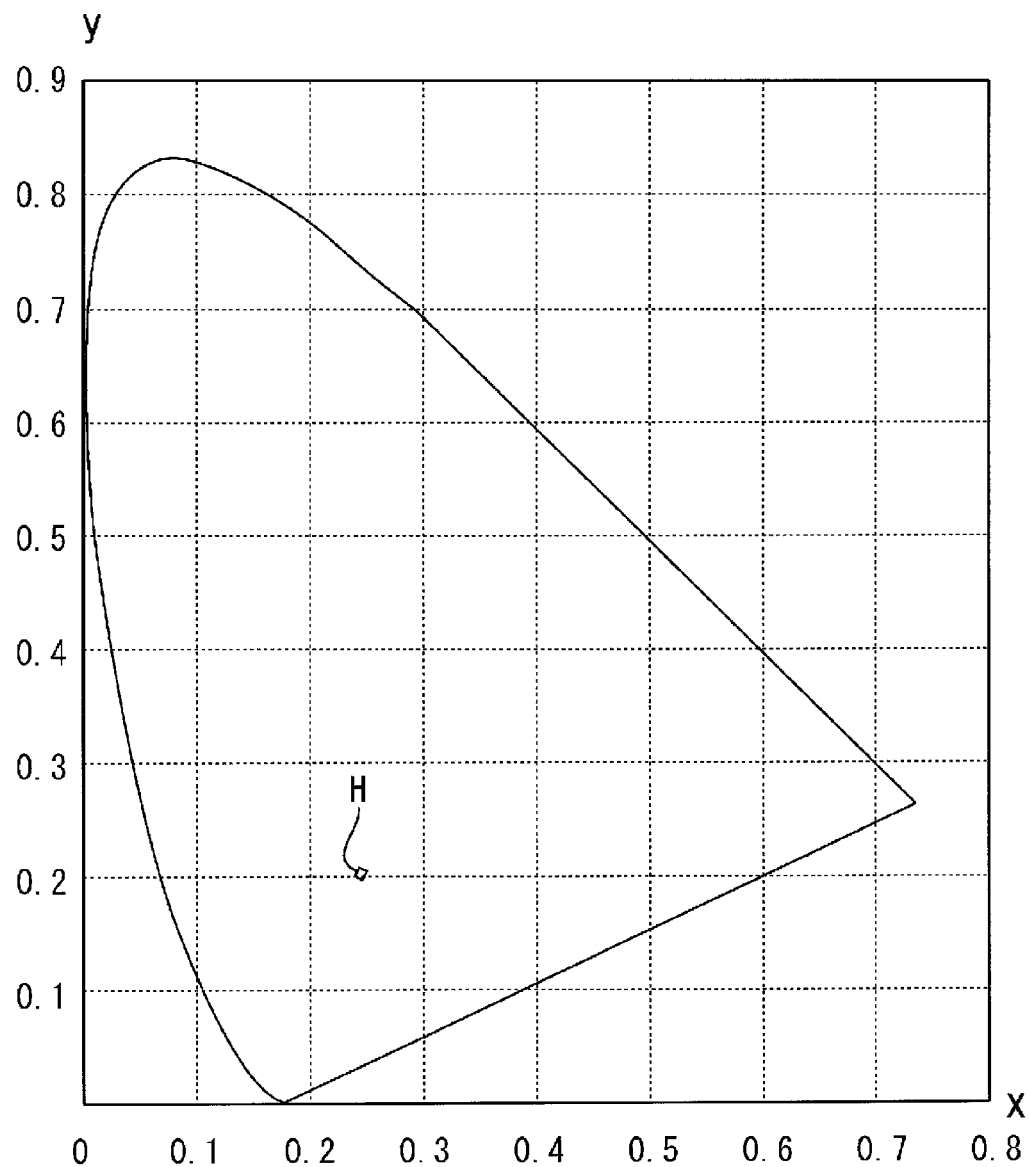
FIG. 9 is a color space chromaticity diagram created by the International Commission on Illustration (CIE) in 1931.
Figure 10:
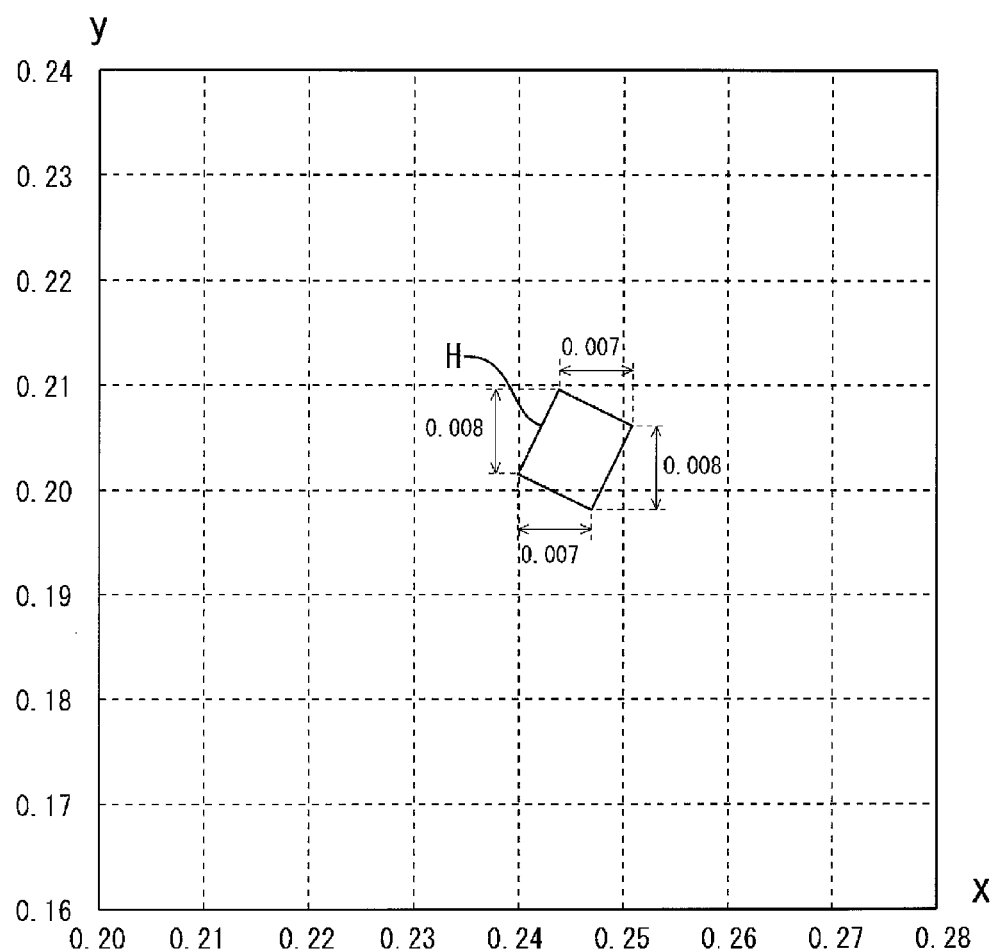
FIG. 10 is a partial magnified view of an equivalent color range in FIG. 9.

Colors of white light emitted by the white LEDs 17 are not uniform. Some variations in color of white light may be present. In this embodiment, color variations of the LEDs 17 on each LED board 20 are allowed but color variations of the LEDs 17 on different LED boards 20 are controlled to be within a range. The range will be discussed below with reference to FIGS. 8 to 10. FIG. 8 is a schematic view for explaining an average color of LEDs on each LED board. FIG. 9 is a color space chromaticity diagram created by the International Commission on Illustration (CIE) in 1931. FIG. 10 is a partial magnified view illustrating a partial magnified view of an equivalent color range in FIG. 9.

As illustrated in FIG. 8, six LEDs 17 are mounted on each LED board 20 in this embodiment. The colors of the LEDs 17 may be the same or may be different. When the colors of the LEDs 17 on each LED board 20 are averaged, an average color of the LEDs 17 on the LED board 20 is within an equivalent color range H illustrated in FIGS. 9 and 10. The equivalent color range H is defined by two opposed lines each having a length of 0.015 x-coordinate distance and two opposed lines each having a length of 0.015 y-coordinate distance in the CIE 1931 color space chromaticity diagram in FIGS. 9 and 10. In the equivalent color range H corresponds to a target color or a range including the target color.

As describe above, the average color of the LEDs 17 on each LED board 20 is within the equivalent color range H. The equivalent color range H is defined by two opposed lines each having a length of 0.015 x-coordinate distance and two opposed lines each having a length of 0.015 y-coordinate distance in the CIE 1931 color space chromaticity diagram. The equivalent color range H defined by two opposed lines each having a length of 0.015 x-coordinate distance and two opposed lines each having a length of 0.015 y-coordinate distance in the CIE 1931 color space chromaticity diagram is a range in which the colors are equivalent and thus color variations are less likely to be recognized. Therefore, the color variations are less likely to be recognized between the LED boards 20. As a result, a uniform overall color can be achieved and thus light with a substantially uniform color can be achieved.

The LEDs 17 are arranged in line along the longitudinal direction of the LED boards 20 in this embodiment. The arrangement of the LEDs 17 is defined according to the arrangement of the LED boards 20. Therefore, the arrangement of the LEDs 17 can be easily designed.

The LEDs 17 are arranged at equal intervals on each LED board 20 in this embodiment. The arrangement of the LEDs 17 is not altered according to the LED boards 20. Therefore, even when the size of the backlight unit 12 is altered, the LED boards 20 can be still used.

The LED boards 20 are arranged along the longitudinal direction thereof and the adjacent LED boards 20 are connected by the connectors 22.

By preparing the LED boards 20 having different lengths, that is, on which different numbers of LEDs 17 are arranged, and connecting them by the connectors 22, the LED boards 20 can be used for different sizes (or lengths) of the backlight units 12. Namely, the LED boards 20 exclusively for a specific size of the backlight unit 12 are not required. This contributes to a cost reduction.

In this embodiment, each connector 22 includes the first connector 22a and the second connector 22b. The first connector 22a projects from the end of the long side of the LED board 20.

Because at least one of the first connector 22a and the second connector 22b project outward from the LED board 20, the first connector 22a and the second connector 22b can be smoothly engaged when the adjacent LED boards 20, 20 are connected by the first connector 22a and the second connector 22b.

The connectors 22 are in white color. The connectors 22 have relatively high light reflectivity. Therefore, the connectors 22 are less likely to absorb light and thus uneven brightness is less likely to occur.

The chassis 14 has a rectangular plan-view shape. Each LED board 20 is arranged with the long-side direction thereof aligned with the longitudinal direction of the chassis 14.

In comparison to the configuration in which each LED board 20 is arranged with the longitudinal direction thereof aligned with the short-side direction of the chassis 14, the number of the LED boards 20 can be reduced. Therefore, the number of control units for turning on and off the LEDs 17 can be reduced. As a result, the cost can be reduced.

The LEDs 17 are used as light sources. Therefore, the light sources with long lives and low power consumptions can be provided.

In this embodiment, each LED 17 is prepared by applying the phosphor having the light emitting peak in the yellow range to the blue light emitting chip and used as a light source.

When the white LEDs 17 are used, the colors tend to vary. The light may be bluish white depending on conditions of the phosphors (e.g., concentrations, film thicknesses). With the configuration of this embodiment, the colors in the entire area are evened, and light with a substantially uniform overall color can be achieved.

The LEDs 17 are electrically connected in series.

Because an equal amount of current is supplied to each LED 17, the amounts of light emitted from the LEDs 17 can be equalized. Therefore, evenness in brightness on the illuminated surface of the backlight unit 12 improves.

The diffuser lenses 21 configured to diffuse the light from the respective LEDs 17 are mounted so as to cover the respective LEDs 17. The light is diffused by the diffuser lenses 21. Therefore, even when a distance between the adjacent LEDs 17, 17 is increased, dot-like lamp images are less likely to appear. By reducing the number of the LEDs 17, the cost can be reduced. Furthermore, a substantially uniform brightness distribution can be achieved. With the diffuser lenses 21, colors of light from the LEDs 17 are mixed and thus color variations can be reduced. Therefore, the colors are further evened.

The diffuser lenses 21 are light diffusing members configured to diffuse light. Therefore, the light can be properly diffused.

Because the surfaces of the diffuser lenses 21 on the LED board 20 side are treated by surface roughing. Therefore, the light is further properly diffused.

<Second Embodiment>

Next, a second embodiment of the present invention will be explained with reference to FIGS. 11 and 12. In this embodiment, a color of LEDs on each LED board will be explained. Other configurations are the same as the first embodiment. The same parts as those in the first embodiment will be indicated by the same symbols and will not be explained.

Figure 11:
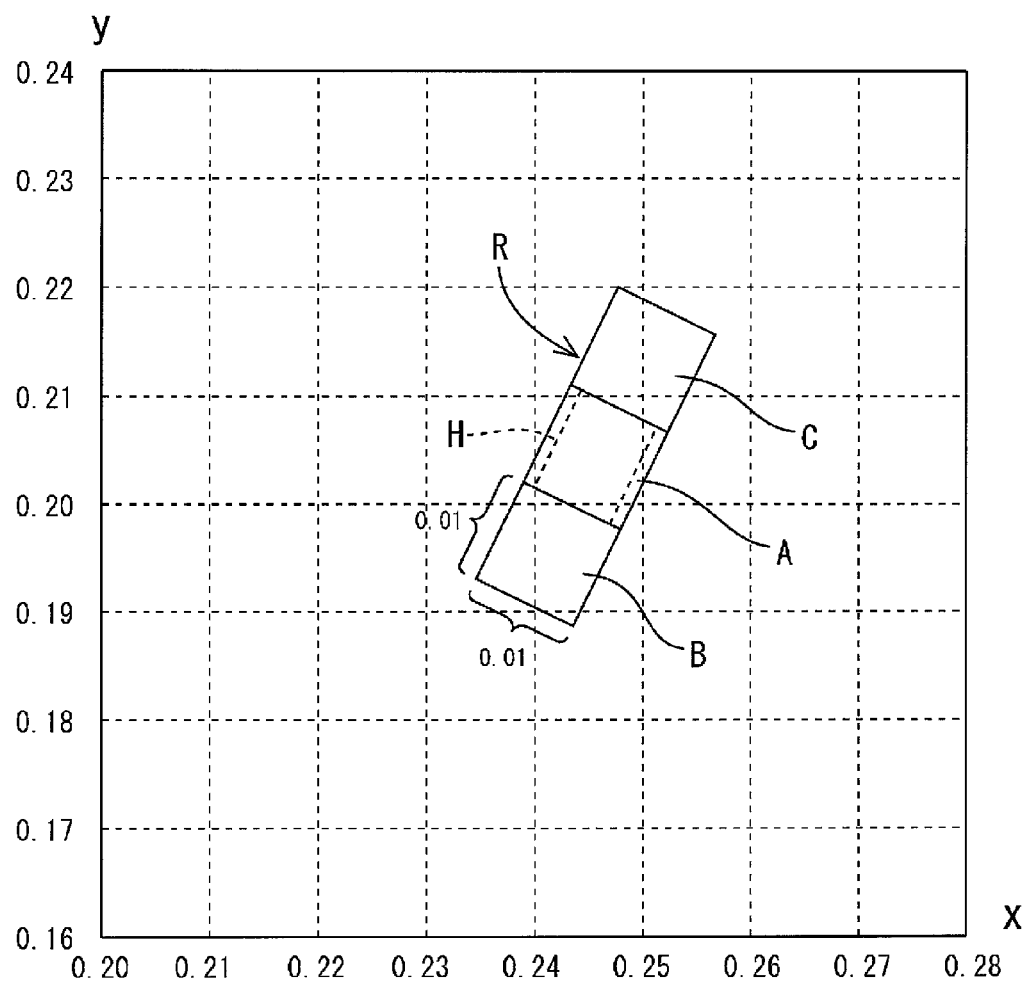
FIG. 11 is a partial magnified view illustrating color ranges of LEDs in a backlight unit of a second embodiment of the present invention, the colors being defined in the color space chromaticity diagram created by the International Commission on Illustration (CIE) in 1931.

FIG. 11 is a partial magnified view illustrating colors of LEDs in a backlight unit of a second embodiment of the present invention, the colors being defined in the color space chromaticity diagram created by the International Commission on Illumination (CIE) in 1931. FIG. 12 is a schematic view illustrating arrangements of the LEDs with different colors on LED boards.

The colors of the LEDs 17 in this embodiment vary within a use rage R defined by solid lines in the CIE 1931 diagram in FIG. 11. The use range R is divided into three color ranges A, B, and C, each of which is defined by a square. Each side of the square has a length of 0.015 coordinate distance, which means an actual distance between points of two adjacent corners of the square, that is, the actual distance between ends of one side is 0.015. More specifically, the center area of the use range R is the color range A (a first color range). The color range A corresponds to a target color and a large number of the LEDs is within this range. The range below the color range A is the color range B (a third color range). The range above the color range A is the color range C. The LEDs 17 having the colors off the target color are in the color ranges B and C. The color ranges A and B are the adjacent color ranges. The color ranges A and C are the adjacent color ranges. Namely, the color ranges B and C are not the adjacent color ranges. Each color range A, B, or C, which is a square having 0.015-long sides, is a color range of the LEDs 17 in which colors are not recognized as different colors. The color range A includes the equivalent color range H. A border between the color range A and the color range C is one of the sides of the equivalent color range H. A boarder between the color range A and the color range B is one of the sides of the equivalent color range H.

Next, the arrangements of the LEDs 17 on the LED boards 20 will be explained with reference to FIG. 12.

Figure 12:
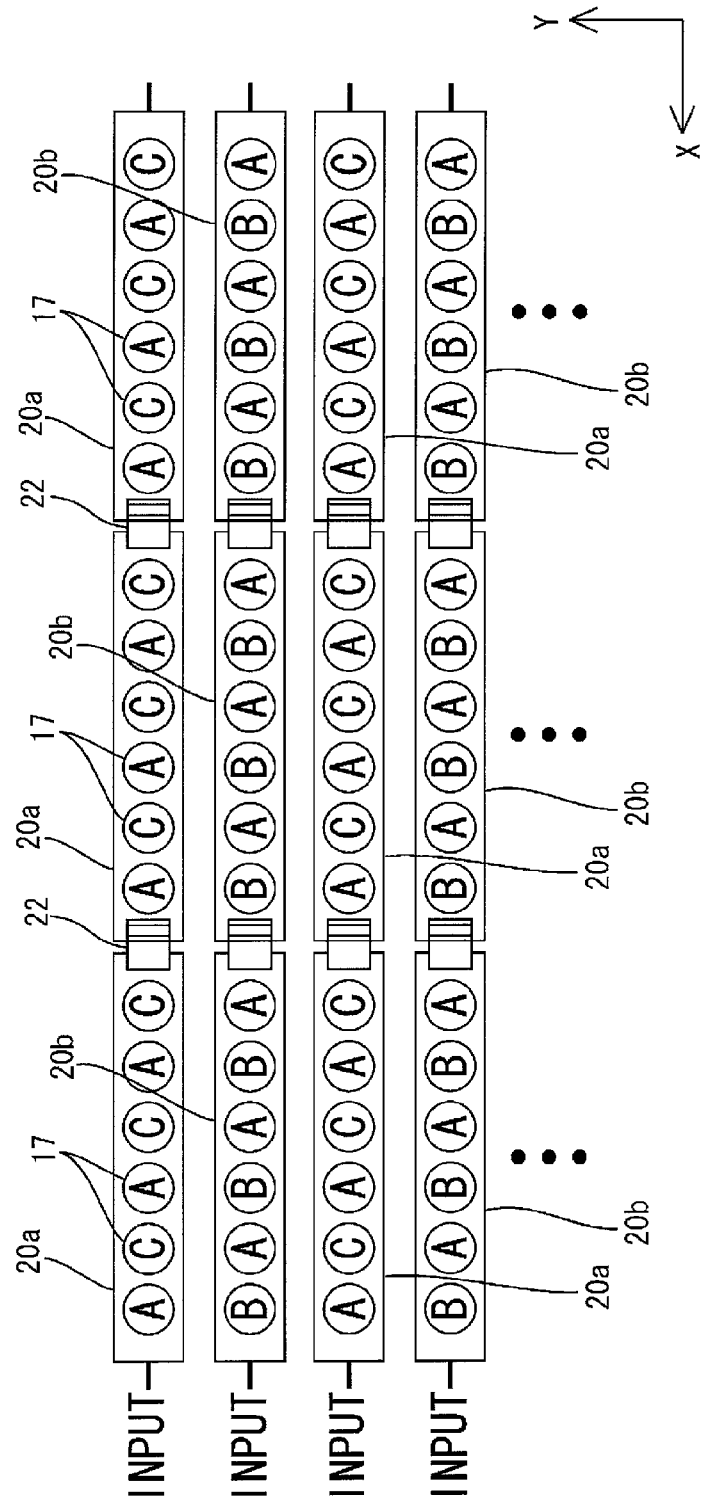
FIG. 12 is a schematic view illustrating arrangements of the LEDs in different color ranges on LED boards.

As illustrated in FIG. 12, on each LED board 20 (20a, 20b), the LEDs 17 with different colors A, B, and C are mounted. When the LED boards 20 are viewed with respect to the row direction (the X-axis direction, the longitudinal direction of the chassis 14, the longitudinal direction of the LED boards 20a, 20b), three first LED boards (a first light source board) 20a, 20a, 20a are connected in series by the connectors 22 in the first row at the uppermost of the arrangement of the LED boards 20. Each first LED board 20a includes the LEDs 17 in the color ranges A, C, A, C, A, C arranged in this sequence from the left in FIG. 12. The LEDs 17 in the color range A and the LEDs 17 in the color range C are alternately arranged. The adjacent LEDs 17, 17 on the first LED board 20a are in the adjacent color ranges (A and C).

In the second row below the first row, three second LED boards (a second light source board) 20b, 20b, 20b are connected in series by the connectors 22. Each second LED board 20b includes the LEDs 17 in the color ranges B, A, B, A, B, A in this sequence from the left in FIG. 12. The LEDs 17 in the color range A and the LEDs 17 in the color range B are alternately arranged. The adjacent LEDs 17, 17 on the second LED board 20b are in the adjacent color ranges (A and B). In the third row, the first LED boards 20a are arranged. In the fourth row, the second LED boards 20b are arranged. In rows under the fourth row, the first LED boards 20a and the second LED boards 20b are arranged in the alternate rows.

Furthermore, the adjacent LEDs 17, 17 on the respective adjacent first LED boards 20a, 20a connected in series in the X-axis direction are in the adjacent color ranges (A and C). The adjacent LEDs 17, 17 on the respective adjacent second LED boards 20b, 20b connected in series in the X-axis direction are in the adjacent color ranges (A and B). The LEDs 17, 17 adjacently arranged with respect to the X-axis direction are all in the adjacent color ranges (A and B, or A and C). Namely, the LEDs 17 that are two color ranges apart (B and C) are not adjacently arranged.

When the LED boards 20 are viewed with respect to the column direction (the Y-axis direction, the short-side direction of the chassis 14, the arrangement direction of the LED boards 20a, 20b), the first LED boards 20a and the second LED boards 20b are alternately arranged. The first column at the leftmost in FIG. 12 includes the LEDs 17 in the color ranges A, B, A, B, . . . arranged in this sequence. The second column includes the LEDs 17 in the color ranges C, A, C, A, . . . arranged in this sequence. The rest of columns are formed by repeating the above arrangements. Among the first LED boards 20a and the second LED boards 20b arranged parallel to one another, the adjacent LEDs 17, 17 with respect to the row direction (the Y-axis direction) are in the adjacent color ranges (A and B, or A and C). Namely, the LEDs 17 that are two color ranges apart (B and C) are not adjacently arranged.

On each first LED board 20a, the LEDs 17 with the color ranges A and C are alternately arranged. An average color of the LEDs 17 on the first LED board 20a is on the border between the color ranges A and C, or in the color range A. On each second LED board 20b, the LEDs 17 with the color ranges A and B are alternately arranged. An average color of the LEDs 17 on the second LED board 20b is on the boarder between the color ranges A and B, or in the color range B. The equivalent color range H is included in the color range A. Two sides of the equivalent color range H are the border between the color range A and the color range C and the boarder between the color range A and the color range B. The average color of the LEDs 17 on the first LED board 20a and the average color of the LEDs 17 on the second LED board 20b are in the equivalent color range H.

As described above, the LEDs 17 in this embodiment are classified into the color ranges A, B, and C according to the colors. The color range A is defined by a square having 0.015-long sides in the CIE 1931 diagram and includes the equivalent color range H. Each of the color ranges C and B is defined by a square having a 0.015-long side and located next to the color A. The LED boards 20 include the first LED boards 20a and the second LED boards 20b. On each first LED board 20a, the LEDs 17 in the color ranges A and B are mounted. On each second LED board 20b, the LEDs 17 in the color ranges A and B are mounted. The first LED boards 20a and the second LED boards 20b are alternately arranged.

With this configuration, the average colors do not significantly differ from one another among the alternately arranged first LED boards 20a and second LED boards 20b. Therefore, the uneven color is less likely to occur.

In this embodiment, the LEDs 17 in the color ranges A and C are alternately arranged on each first LED board 20a. The LEDs 17 in the color ranges A and B are alternately arranged on each second LED board 20b.

With this configuration, the adjacent LEDs 17, 17 on each of the first LED boards 20a, 20b are in the adjacent color ranges (A and B, or A and C). Therefore, their colors do not significantly differ from one another and thus the uneven color is further less likely to occur.

The second embodiment has been explained above. However, the present invention is not limited to the above embodiment. For example, the following various modifications can be included in the scope of the present invention. In the following modifications, the same components and members as those in the second embodiment will be indicated by the same symbols and will not be explained.

<First Modification of the Second Embodiment>

Figure 13:
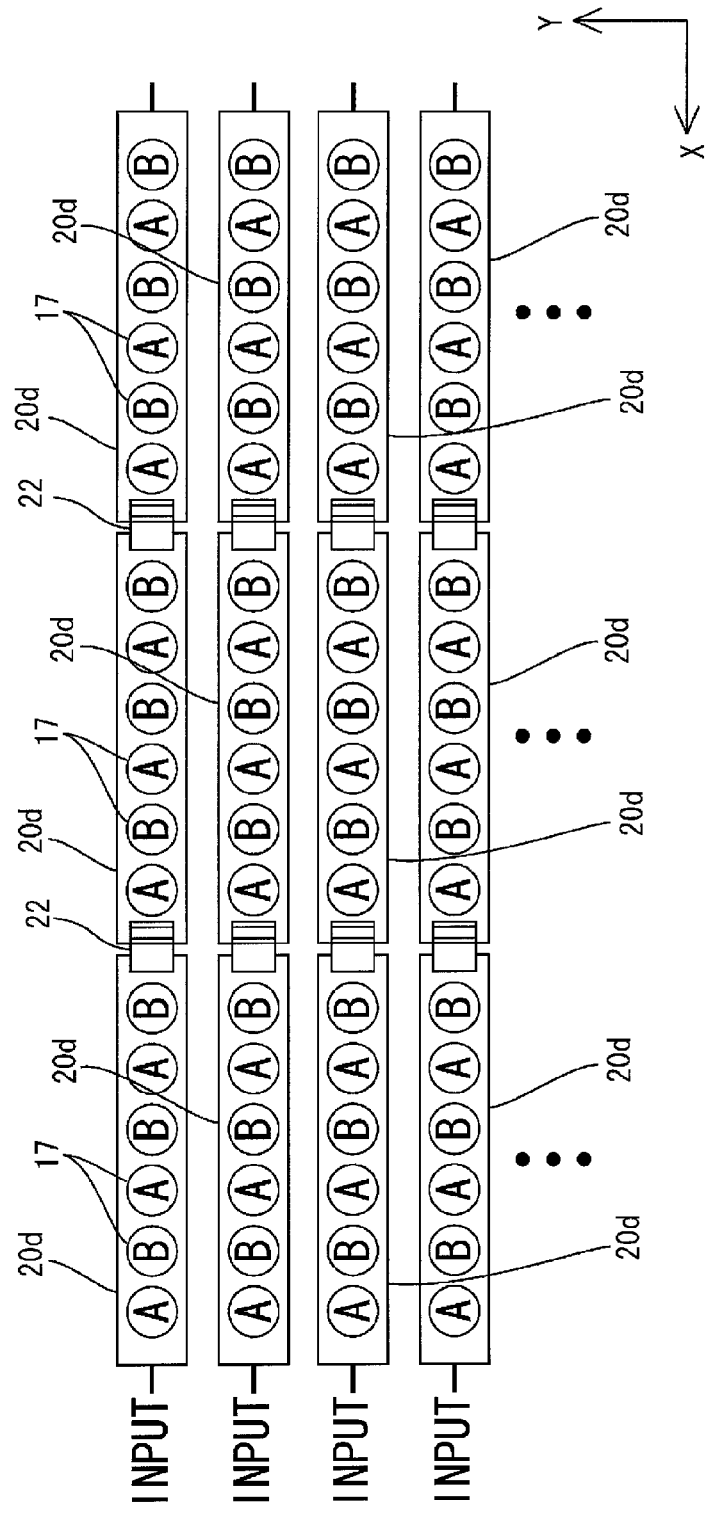
FIG. 13 is a schematic view illustrating other arrangements of the LEDs in different color ranges on LED boards.

As a modification of the arrangement of the LEDs 17, an arrangement illustrated in FIG. 13 may be used. FIG. 13 is a schematic view illustrating a different arrangement of the LEDs in different color ranges on LED boards.

In FIG. 13, when the LED boards are viewed with respect to the X-axis direction (the row direction, the longitudinal direction of the third LED boards 20d), three third LED boards 20d, 20d, 20d are arranged in the first row at the uppermost of the arrangement are electrically and physically connected by the connectors 22. The LEDs 17 in the colors A, B, A, B, A, and B in this sequence from the left in FIG. 13 are arranged. The adjacent LEDs 17, 17 on the third LED boards 20d are in the adjacent color ranges (A and B). In each of the second row, the third row, the fourth row, . . . , three LED boards 20d are connected as in the first row. When the LED boards are viewed with respect to the Y-axis direction (the arrangement direction of the third LED boards 20d), the LEDs 17 in the color ranges A, A, A, A, . . . are arranged in the first column. The LEDs 17 in the color ranges B, B, B, B, . . . are arranged in the second column. The LEDs 17, 17 arranged adjacently with respect to the arrangement direction are in the same color range (A and A, or B and B). The average color on each third LED board 20d is on the border between the color ranges A and B, or in the color range A, namely, in the equivalent color range H.

With this configuration, the colors of the adjacent LEDs 17, 17 do not significantly differ from each other, and thus the uneven color is less likely to occur. Especially in this example, kinds of the prepared LED boards 20 (the third LED boards 20d) can be reduced. This contributes to a cost reduction.

<Second Modification of the Second Embodiment>

Figure 14:
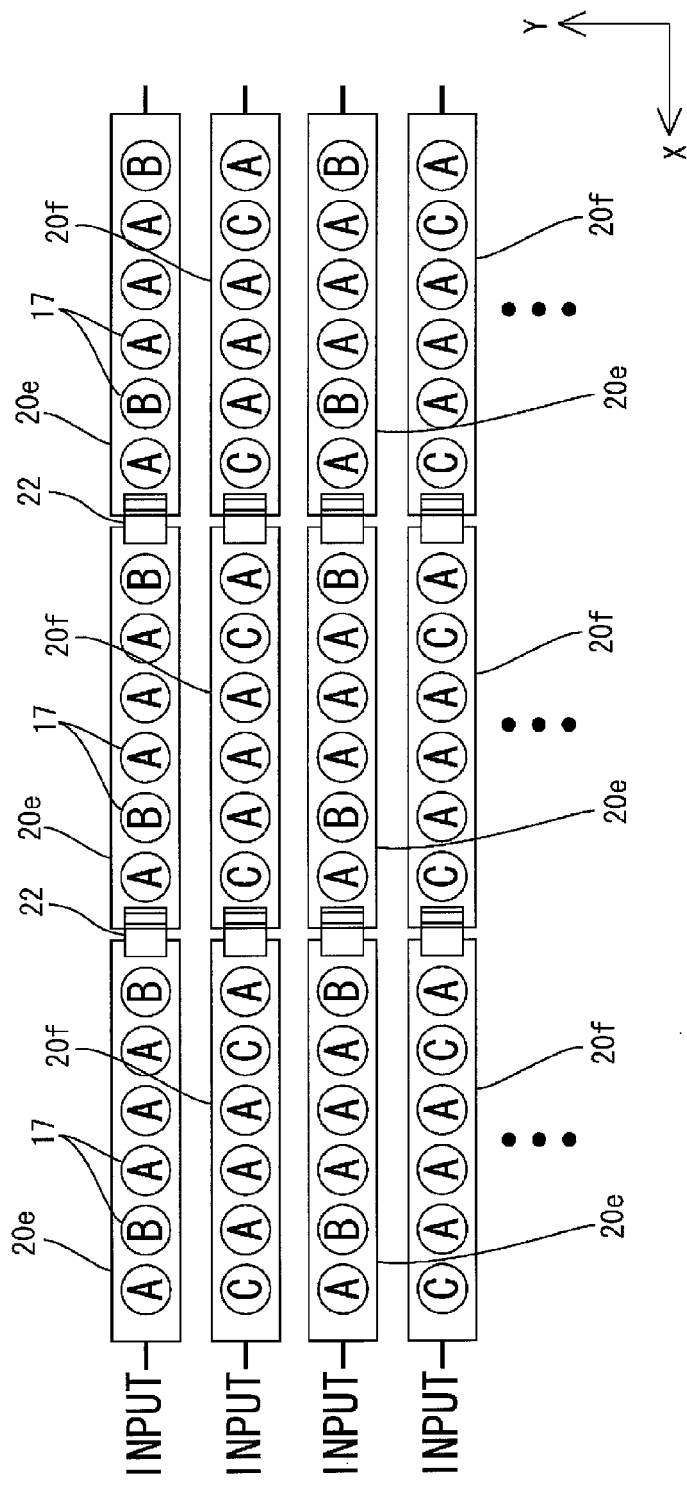
FIG. 14 is a schematic view illustrating other arrangements of the LEDs in different color ranges on LED boards.

As a modification of the arrangement of the LED boards 17, the arrangement illustrated in FIG. 14 can be used. FIG. 14 is a schematic view illustrating a different arrangement of the LEDs in different color ranges.

In FIG. 14, when the LED boards are viewed with respect to the X-axis direction (the row direction, the longitudinal direction of the LED boards 20e, 20f), three fourth LED boards 20e, 20e, 20e arranged in the first row at the uppermost of the arrangement are electrically and physically connected by the connectors 22. The LEDs 17 in the color ranges A, B, A, A, A, B are arranged in this sequence from the left in FIG. 14 on each fourth LED board 20e. The adjacent LEDs 17, 17 on the fourth LED board 20e are in the same color range (A and A), or in the adjacent color ranges (A and B). In the second row, three fifth LED boards 20f, 20f, 20f arranged in the second row are electrically and physically connected by the connectors 22. On each fifth LED board 20f, the LEDs 17 in the color ranges C, A, A, A, C, A are arranged in this sequence from the left in FIG. 14. The adjacent LEDs 17, 17 on the fifth LED board 20f are in the same color range (A and A), or in the adjacent color ranges (A and C). The average color on the fourth LED board 20e is in the color range A. The average color on the fifth LED board 20f is in the color range A. Namely, the average colors on the fourth LED board 20e and the fifth LED board 20f are in the equivalent color range H.

With this configuration, the colors of the LEDs 17, 17 arranged adjacently with respect to the column direction and the row direction do not significantly differ from one another. Therefore, uneven color is less likely to occur. This example is especially preferable in the case that the number of LEDs 17 in the color range A, which is the target range, is significantly larger than the number of the LEDs 17 in the color ranges B and C.

<Third Modification of the Second Embodiment>

Figure 15:
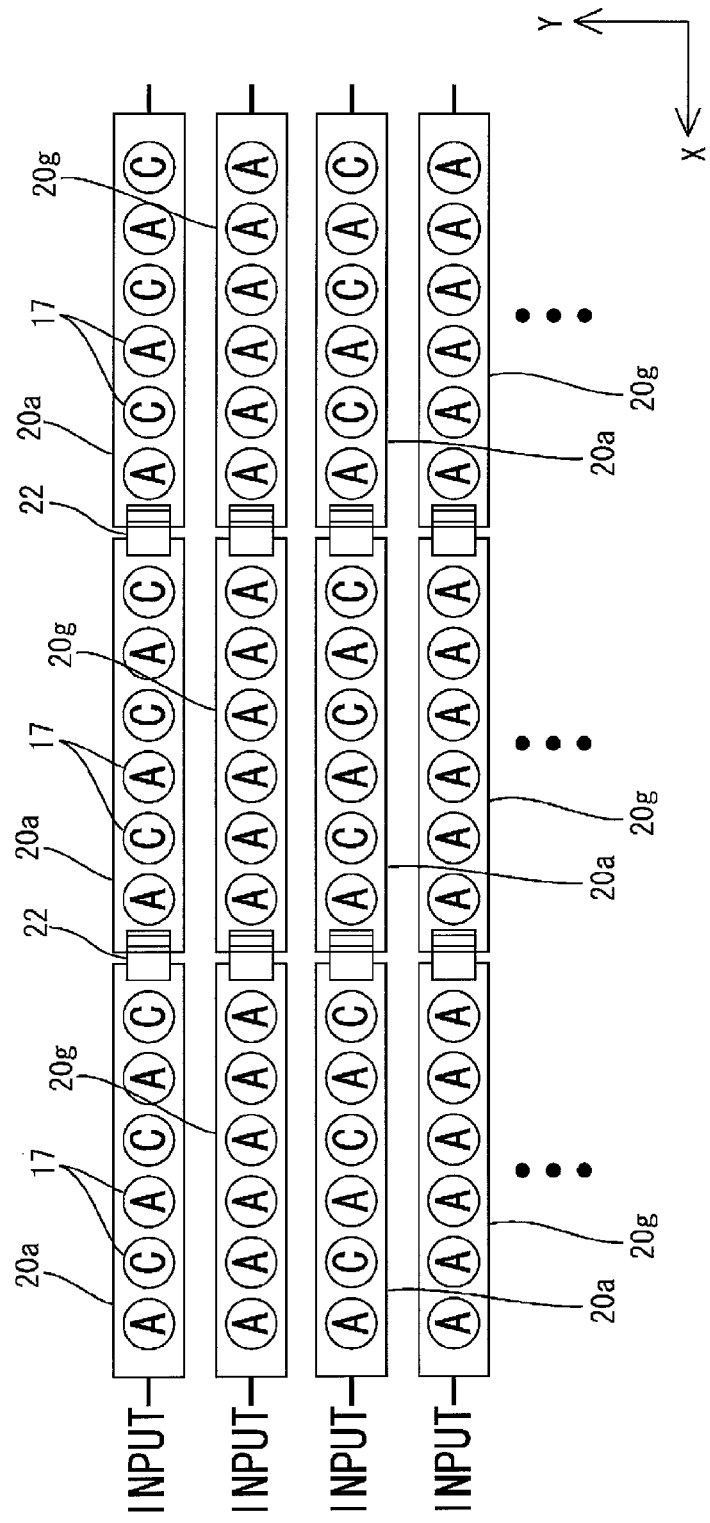
FIG. 15 is a schematic view illustrating other arrangements of the LEDs in different color ranges on LED boards.

As a modification of the arrangement of the LEDs 17, an arrangement illustrated in FIG. 15 may be used. FIG. 15 is a schematic view illustrating a different arrangement of the LEDs in different color ranges on the LED boards.

In FIG. 15, when the LED boards are viewed with respect to the X-axis direction (the row direction, the longitudinal direction of the LED boards 20a, 20g), three first LED boards 20a, 20a, 20a arranged in the first row at the uppermost of the arrangement are electrically and physically connected by the connectors 22. On each first LED board 20a, the LEDs 17 in the color ranges A, C, A, C, A, C are arranged in this sequence from the left in FIG. 15. The adjacent LEDs 17, 17 on the first LED board 20*a* are in the adjacent color ranges (A and C). In the second row, three sixth LED boards 20*g*, 20*g*, 20*g* are electrically and physically connected by the connectors 22. On the sixth LED board 20*g*, the LEDs 17 in the color ranges A, A, A, A, A, A are arranged in this sequence from the left in FIG. 15. Namely, the adjacent LEDs 17, 17 on the sixth LED board 20*g* are in the same color range (A).

With this configuration, the LEDs 17 with the adjacent color ranges (A and C) are adjacently arranged and mounted on the first LED board 20*a*. Therefore, the colors of the adjacent LEDs 17, 17 do not significantly differ from each other and thus uneven color is less likely to occur. Furthermore, the LEDs 17 in the color range A are adjacently arranged on the sixth LED board 20*g* and thus the uneven color is further less likely to occur. This example is especially preferable in the case that the number of the LEDs 17 in the color range A, which is a target range, is significantly larger than the numbers of the LEDs 17 in the color ranges B and C.

<Third Embodiment>

A third embodiment of the present invention will be explained with reference to FIGS. 16 and 17. In this embodiment, an arrangement of the LEDs in different color ranges on each LED board. Other configurations are the same as the first embodiment. The same parts as those in the first embodiment will be indicated by the same symbols and will not be explained.

Figure 16:
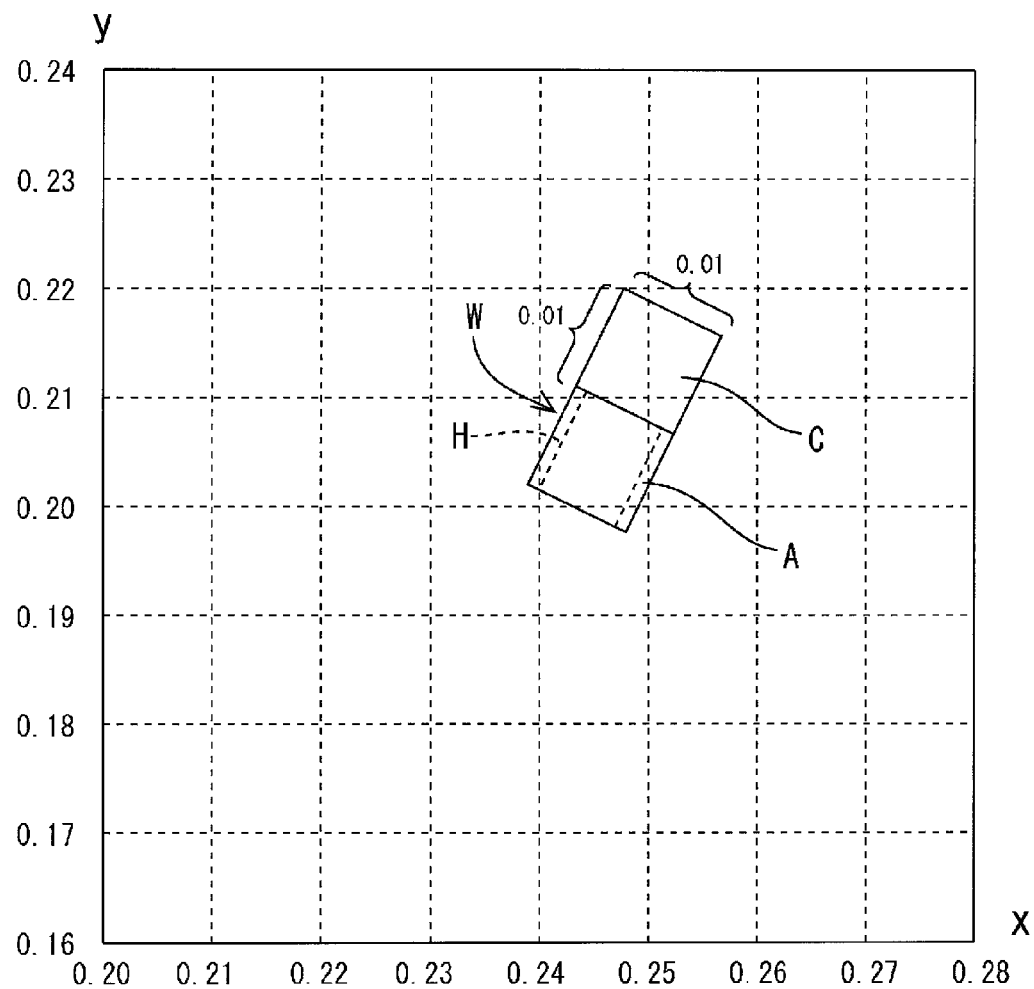
FIG. 16 is a partial magnified view illustrating color ranges of LEDs in a backlight unit of a third embodiment of the present invention, the color ranges being defined in the color space chromaticity diagram created by the International Commission on Illustration (CIE) in 1931.

FIG. 16 is a partial magnified view illustrating color ranges of LEDs in a backlight unit, the color ranges being defined in the color space chromaticity diagram created by the International Commission on Illumination (CIE) in 1931. FIG. 17 is a schematic view illustrating arrangements of the LEDs in different color ranges on the LED boards.

The color ranges of the LEDs 17 in this embodiment vary within a range of a use area W defined by solid lines in the CIE 1931 diagram in FIG. 16. The use area W is divided into two ranges: a color range A and a color range B. Each range is defined by a square, each side of which is 0.015 coordinate length. Each side of the square area has a length of 0.015 coordinate distance, which means an actual distance between two adjacent corners of the square, that is, the actual distance between ends of one side is 0.015. More specifically, the color range A (a first color range) corresponds to the target color. The range above the color range A is the color range C (a second color range). The LEDs 17 having the colors off the target color are in the color range C. The color ranges A and C are the adjacent color ranges. Each color range A or C, which is a square having 0.015-long sides, is a color range of the LEDs 17 in which colors are not recognized as different colors. The color range A includes the equivalent color range H. A border between the color range A and the color range C is one of the sides of the equivalent color range H.

Next, the arrangements of the LEDs 17 on the LED boards 20 according to the color ranges will be explained with reference to FIG. 17.

In FIG. 17, when the LED boards area viewed with respect to the X-axis direction (the row direction, the longitudinal direction of the first LED boards 20*h*, 20*j*), three seventh LED boards 20*h*, 20*h*, 20*h* are electrically and physically connected by the connectors 22 in the first row at the uppermost of the arrangement. The LEDs 17 with the color ranges A, A, A, A, A, A are arranged in this sequence from the left in FIG. 17 on each seventh LED board (a third light source board) 20*h*. Namely, the adjacent LEDs 17, 17 on the seventh LED board 20*h* are in the color range A. In the second row, three eighth LED boards (a fourth light source board) 20*j*, 20*j*, 20*j* are electrically and physically connected by the connectors 22. On the eighth LED board 20*j*, the LEDs 17 with the color ranges C, A, C, A, C, A are arranged in this sequence from the left in FIG. 17. Namely, the adjacent LEDs 17, 17 on the eighth LED board 20*j* are in the adjacent color ranges (A and C).

Furthermore, when the arrangement of the LEDs is viewed with respect to the column direction (the Y-axis direction, the short-side direction of the chassis 14, the arrangement direction of the LED boards 20*h*, 20), the seventh LED boards 20*h* and the eighth LED boards 20*g* are alternately arranged. The LEDs 17 in the color ranges A, C, A, C, . . . are arranged in this sequence from the left in FIG. 17 in the first row. In the second row, the LEDs 17 with the colors A, A, A, A, . . . are arranged in this sequence. The rest of rows are formed by repeating the above arrangements. Among the seventh LED boards 20*h* and the eighth LED boards 20*j* arranged parallel to one another, the adjacent LEDs 17, 17 with respect to the column direction (the Y-axis direction) are in the adjacent color ranges (A and C) or in the same color range A. The average color on each seventh LED board 20*h* and the average color on each eighth LED board 20*j* are both in the equivalent color range H.

In the configuration of this embodiment, the seventh LED boards 20*h* and the eighth LED boards 20*j* are alternately arranged and the average colors thereof do not significantly differ from one another. Therefore, uneven color is less likely to occur.

In this embodiment, the LEDs 17 in the color range A and the LEDs 17 in the color C are alternately arranged on the eighth LED boards 20*j*.

With this configuration, the adjacent LEDs 17, 17 on each eighth LED board 20*j* are in the adjacent color ranges (A and C). Therefore, the colors of the LEDs 17 do not significantly differ from one another and thus the uneven color is further less likely to occur.

<Other Embodiments>

The embodiments according to the present invention have been described. The present invention is not limited to the embodiments explained in the above description with reference to the drawings. The following embodiments may be included in the technical scope of the present invention, for example.

(1) In the second embodiment, three color ranges are used. However, the number of color ranges is not limited to three. Four or more color ranges may be used.

(2) In the second embodiment, the LED boards on which the LEDs are arranged in the same layout according to the color ranges with respect to the longitudinal direction of the chassis (the X-axis direction). However, LED boards on which the LEDs are arranged in different layout according to the colors may be connected.

(3) In the above embodiments, three LED boards are arranged along the longitudinal direction of the chassis (the X-axis direction) and connected. However, the number of the LED boards may be one or two, or more than three. Furthermore, the number of the LEDs arranged on each LED board is not limited to six. Any number of the LEDs can be arranged on each LED board.

(4) In the above embodiments, the white connectors are used. However, the connectors can be made of materials in different colors, for instance, in ivory color, as long as they have high light reflectivities.

(5) In the above embodiments, the LEDs are arranged in a grid. However, the LEDs may be arranged in a honeycomb structure. Namely, the LEDs may be arranged at equal intervals or in staggered layout.

(6) In the above embodiments, the diffuser lenses are arranged so as to cover the respective LEDs. However, the diffuser lenses may not be required. By closely arranging the LEDs, dot-like lamp images are less likely to appear.

(7) In the above embodiments, the white LEDs are used. However, the color of light is not limited to white. LEDs that emit any color of light may be used.

(8) In the above embodiments, the LEDs, each prepared by applying a phosphor having a light emitting peak in an yellow range to a blue light emitting chip to emit white light, are used as light sources. However, a light source may be constructed of an ultraviolet light emitting chip having a light emitting peak around a wavelength of 380 nm and a phosphor that absorbs the ultraviolet light and produces fluorescence. With phosphors having light emitting peak in blue, green, and red ranges, respectively, white light can be achieved. The white light produced by the lighting device in the above configuration has smooth spectrum in a wide visible light range and thus has high color rendering properties. Color variation may be produced due to variations in distributed amount of the phosphors. However, the colors can be evened with the lighting device in the above configuration. Namely, the lighting device having high color rendering properties and fewer tendencies to produce color variations can be provided.

(9) In the above embodiments, the LEDs are used as point light sources. However, other types of light sources can be used.

(10) In the above embodiments, the optical sheet set includes the diffuser plate, the diffuser sheet, the lens sheet, and the reflection-type polarizing sheet. However, the optical may include two diffuser plates that are layered.

The invention claimed is:

1. A lighting device comprising:
   a plurality of light source boards; and
   a plurality of point light sources mounted on the light source boards, wherein
   the plurality of point light sources includes a first group of point light sources and a second group of point light sources, the first group of point light sources and the second group of point light sources are classified in a first color range and a second color range, respectively, according to colors thereof;
   the first color range and the second color range are defined by a first square and a second square, respectively, in a CIE 1931 color space chromaticity diagram, the second square is directly adjacent to the first square, and one edge of the first square is shared with the second square;
   each side of the first square and the second square has a length of 0.015 coordinate distance;
   the plurality of light source boards include first light source boards and second light source boards;
   the first group of point light sources are mounted on both of the first light source boards and the second light source boards;
   the second group of point light sources are mounted only on the first light source boards; and
   the first light source boards and the second light source boards are alternately arranged.

2. The lighting device according to claim 1, wherein:
   the plurality of point light sources further include a third group of point light sources classified in a third color range, the third color range is defined by a third square in the CIE 1931 color space chromaticity diagram, the third square is directly adjacent to the first square, and another edge of the first square is shared with the third square;
   each side of the third square has a length of 0.015 coordinate distance; and
   the third group of point light sources are mounted only on the second light source boards.

3. The lighting device according to claim 2, wherein the first group of point light sources and the second group of point light sources are alternately arranged on the first light source boards.

4. The lighting device according to claim 2, wherein:
   the first group of point light sources and the second group of point light sources are alternately arranged on the first light source boards; and
   the first group of point light sources and the third group of point light sources are alternately arranged on the second light source boards.

5. The lighting device according to claim 1, wherein:
   only the first group of point light sources are mounted on the second light source boards.

6. The lighting device according to claim 1, wherein:
   each of the plurality of light source boards has an elongated shape; and
   the point light sources are arranged in line along a longitudinal direction of the plurality of light source boards.

7. The lighting device according to claim 1, wherein the point light sources are arranged at equal intervals on each of the plurality of light source boards.

8. The lighting device according to claim 1, wherein:
   each of the plurality of light source boards has an elongated shape;
   the plurality of light source boards are arranged along a longitudinal direction thereof; and
   the plurality of light source boards arranged adjacently to each other are connected by connectors.

9. The lighting device according to claim 8, wherein:
   each of the connectors includes a first connector and a second connector engaged with each other; and
   at least one of the first connector and the second connector projects outward from an end of the corresponding light source board with respect to the longitudinal direction of the light source board.

10. The lighting device according to claim 8, wherein each of the connectors has an ivory color or a white color.

11. The lighting device according to claim 1, wherein:
    a chassis that houses the light source boards has a rectangular plan-view shape; and
    the plurality of light source boards are arranged with a longitudinal direction thereof aligned with a longitudinal direction of the chassis.

12. The lighting device according to claim 1, wherein the plurality of point light sources are light emitting diodes.

13. The lighting device according to claim 1, wherein the plurality of point light sources are light emitting diodes including blue light emitting chips with phosphors having a light emitting peak in an yellow range and applied to the respective blue light emitting chips to emit white light.

14. The lighting device according to claim 1, wherein the plurality of point light sources are light emitting diodes including blue light emitting chips with phosphors having light emitting peaks in a green range and in a red range, respectively, and applied to the respective blue light emitting chips to emit white light.

15. The lighting device according to claim 1, wherein the plurality of point light sources are light emitting diodes including blue light emitting chips with phosphors having a light emitting peak in a green range and red light emitting chips, each blue light emitting chip and each red light emitting chip being combined to emit white light.

16. The lighting device according to claim 1, wherein the plurality of point light sources are light emitting diodes, each including a blue light emitting chip, a green light emitting chip, and a red light emitting chip combined to emit white light.

17. The lighting device according to claim 1, wherein each of the plurality of point light sources includes an ultraviolet light emitting chip and a phosphor.

18. The lighting device according to claim 1, wherein the plurality of point light sources include ultraviolet light emitting chips and phosphors having a light emitting peak in a blue range, in a green range, and in a red range, respectively.

19. The lighting device according to claim 1, wherein the plurality of point light sources are electrically connected in series.

20. The lighting device according to claim 1, further comprising diffuser lenses mounted to the plurality of light source boards so as to cover the plurality of point light sources and configured to diffuse light from the plurality of point light sources.

21. The lighting device according to claim 20, wherein the diffuser lenses are light diffusing members configured to diffuse light.

22. The lighting device according to claim 20, wherein each of the diffuser lenses has a surface treated by surface roughing on a light source board side.

23. A lighting device comprising:
a plurality of light source boards; and
a plurality of point light sources on which the light sources are mounted, wherein
the plurality of point light sources includes a first group of point light sources and a second group of point light sources, the first group of point light sources and the second group of point light sources are classified in a first color range and a second color range, respectively, according to colors thereof;
the first color range and the second color range are defined by a first square and a second square, respectively, in a CIE 1931 color space chromaticity diagram, the second square is directly adjacent to the first square, and one edge of the first square is shared with the second square;
the plurality of light source boards include first light source boards and second light source boards;
the first group of point light sources are mounted on both of the first light source boards and the second light source boards;
the second group of point light sources are mounted only on the first light source boards; and
the first light source boards and the second light source boards are alternately arranged.

24. A display device comprising:
the lighting device according to claim 1; and
a display panel configured to provide display using light from the lighting device.

25. The display device according to claim 24, wherein the display panel is a liquid crystal display using liquid crystal.

26. A television receiver comprising the display device according to claim 24.

* * * * *